(12) United States Patent
Stach et al.

(10) Patent No.: US 11,228,623 B2
(45) Date of Patent: Jan. 18, 2022

(54) METHOD FOR TRANSMITTING MEDIA STREAMS BETWEEN RTC CLIENTS

(71) Applicant: RINGCENTRAL, INC., Belmont, CA (US)

(72) Inventors: Thomas Stach, Vienna (AT); Ernst Horvath, Vienna (AT); Johannes Winter, Gumpoldskirchen (AT)

(73) Assignee: RINGCENTRAL, INC., Belmont, CA (US)

( * ) Notice: Subject to any disclaimer, the term of this patent is extended or adjusted under 35 U.S.C. 154(b) by 0 days.

(21) Appl. No.: 15/318,726

(22) PCT Filed: Jun. 2, 2015

(86) PCT No.: PCT/EP2015/001116
§ 371 (c)(1),
(2) Date: Dec. 14, 2016

(87) PCT Pub. No.: WO2016/008558
PCT Pub. Date: Jan. 21, 2016

(65) Prior Publication Data
US 2017/0126751 A1 May 4, 2017

(30) Foreign Application Priority Data
Jun. 26, 2014 (DE) .......................... 102014009495.2

(51) Int. Cl.
*H04L 29/06* (2006.01)
*H04L 29/08* (2006.01)
(52) U.S. Cl.
CPC ...... *H04L 65/1069* (2013.01); *H04L 65/1059* (2013.01); *H04L 65/601* (2013.01);
(Continued)

(58) Field of Classification Search
CPC ....... H04L 67/42; H04L 67/02; H04L 65/608; H04L 65/601; H04L 65/1059; H04L 65/1069; H04L 2012/567
See application file for complete search history.

(56) References Cited

U.S. PATENT DOCUMENTS 8,077,634 B2   12/2011  Maggenti et al.
8,275,197 B2    9/2012  Hawkins et al.
(Continued)

FOREIGN PATENT DOCUMENTS

CN     101262433 A    9/2008
DE  102014108888 A1   12/2014
WO    2014019497 A1    2/2014

OTHER PUBLICATIONS

Justin Uberti; "JavaScript Session Establishment Protocol (JSEP)"; http://lists.w3.org/Archives/Public/public-webrtc/2012Jan/att-0002/JavascriptSessionEstablishmentProtocol.pdf; Dec. 16, 2011 (Year: 2011).*

(Continued)

*Primary Examiner* — Tonia L Dollinger
*Assistant Examiner* — Jihad K Boustany
(74) *Attorney, Agent, or Firm* — Finnegan, Henderson, Farabow, Garrett & Dunner LLP

(57) ABSTRACT

The invention concerns a computer-implemented method for establishing a communication connection suitable for transmitting media streams from a first RTC client to a second RTC client, including generation of requests including media-specific data and/or parameters, as well as adaptation of the request and generation of a response to the adapted request.

19 Claims, 6 Drawing Sheets

(52) U.S. Cl.
CPC ............ *H04L 65/608* (2013.01); *H04L 67/02* (2013.01); *H04L 67/42* (2013.01)

(56) References Cited

U.S. PATENT DOCUMENTS

| | | | |
|---|---|---|---|
| 8,305,980 B1 | 11/2012 | Nix | |
| 8,650,494 B1* | 2/2014 | Sampath | H04L 67/02 715/740 |
| 2003/0112957 A1* | 6/2003 | Kovarik | H04M 3/4228 379/221.01 |
| 2004/0202295 A1* | 10/2004 | Shen | H04L 63/306 379/112.01 |
| 2007/0297339 A1* | 12/2007 | Taylor | H04L 65/1069 370/248 |
| 2013/0067496 A1* | 3/2013 | Thollot | G06Q 30/02 719/318 |
| 2013/0185440 A1* | 7/2013 | Blau | H04L 61/2589 709/227 |
| 2013/0198353 A1* | 8/2013 | Hua | H04L 69/40 709/223 |
| 2013/0290550 A1* | 10/2013 | Bangalore | H04L 65/1069 709/228 |
| 2014/0126715 A1 | 5/2014 | Lum et al. | |
| 2014/0347433 A1* | 11/2014 | Kafle | H04W 76/14 348/14.02 |
| 2015/0081769 A1* | 3/2015 | Mandyam | H04W 4/70 709/203 |
| 2015/0103154 A1* | 4/2015 | Candelore | H04N 21/4852 348/63 |
| 2015/0222730 A1* | 8/2015 | Gower | H04L 67/42 709/203 |
| 2017/0093943 A1* | 3/2017 | Alsina | H04L 67/1095 |

OTHER PUBLICATIONS

International Preliminary Report on Patentability for PCT/EP2015/001116 dated Jan. 5, 2017 (Form IB/338). (English Translation).
Written Opinion of the International Searching Authority for PCT/EP2015/001116 dated Aug. 21, 2015 (Form PCT/ISA/237).
International Search Report for PCT/EP2015/001116 dated Aug. 21, 2015 (Form PCT/ISA/210).
German Office Action for Application No. 10 2014 009 495.2, dated Apr. 14, 2015.

* cited by examiner

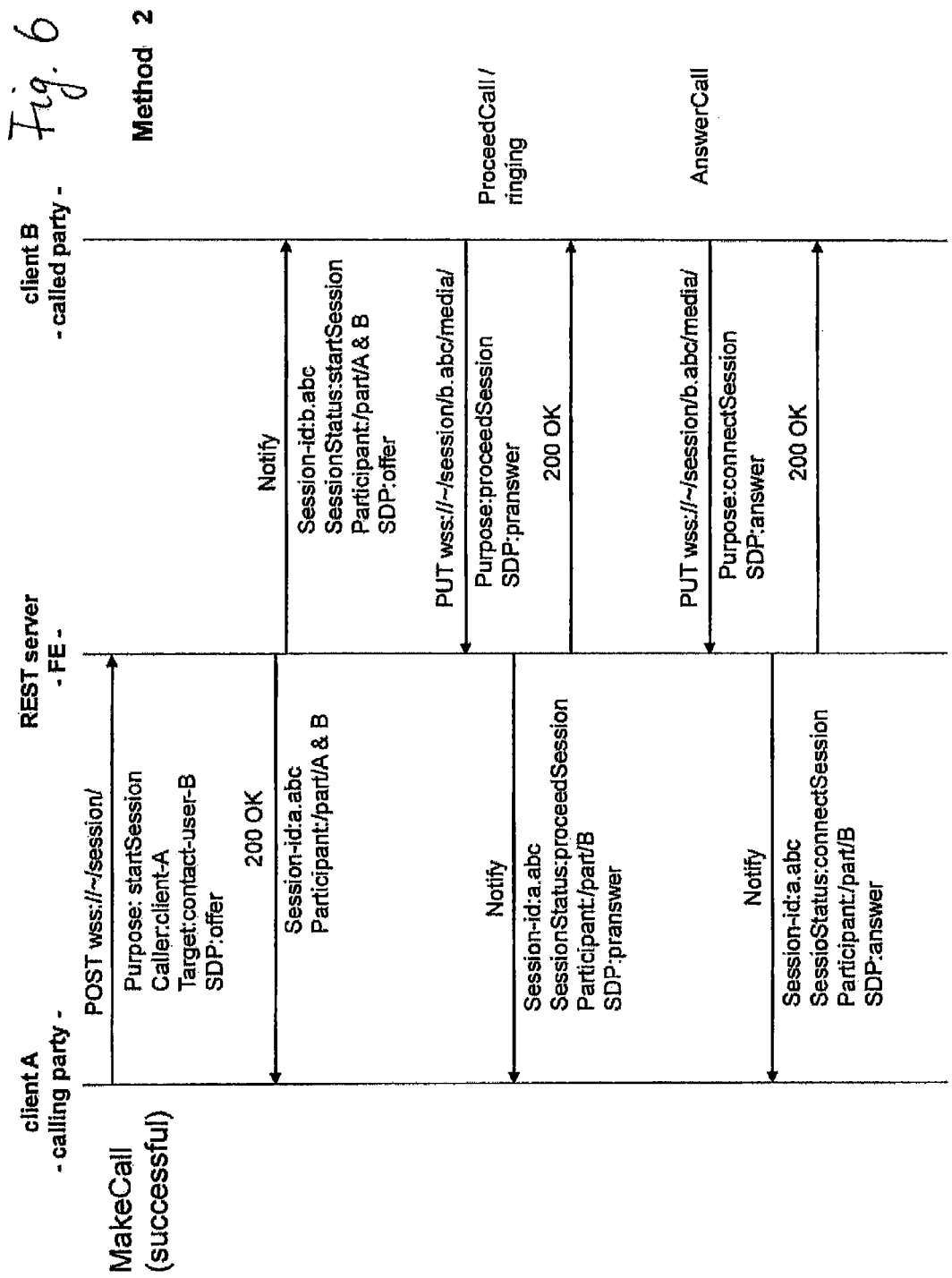

METHOD FOR TRANSMITTING MEDIA STREAMS BETWEEN RTC CLIENTS

CROSS-REFERENCE TO RELATED APPLICATIONS

This application is the United States national phase of PCT International Application No. PCT/EP2015/001116, filed on Jun. 2, 2015, and claiming priority to German Application No. 102014009495.2, filed on Jun. 26, 2014.

BACKGROUND OF THE INVENTION

Field of Invention

Embodiments concern a method for establishing a communication connection suitable for transmitting media streams from a first Real-Time Communication (RTC) client to a second RTC client. Embodiments also concern a computer program or computer program product implementing the method, a corresponding machine-readable data carrier with the computer program stored on it, and a telecommunication system.

Background of the Related Art

Based, among other things, on a WebRTC initiative (Real-Time Communication via the Worldwide Web) from the IETF (Internet Engineering Task Force) and W3C (World Wide Web Consortium), the JSEP (JavaScript Session Establishment Protocol) is often used for exchanging media-specific data and parameters between a web browser and a JavaScript-based application running on the browser, in order to establish an IP-based communication connection with another browser, an IP-based telephone, or a gateway in a telephone network. The JSEP is described in an IETF specification, and the current state of the work is documented in http://tools.ietf.org/html/draft-ietf-rtcweb-jsep-02. The JSEP is based on the exchange of SDP-based media descriptions (SDP=Session Description Protocol, RFC [Request for Comments] 4566) and uses a two-stage signaling model. In the first stage, the browser's abilities (also called capabilities) are called up in the form of an SDP data set (using a CreateOffer command, for example). In a second stage, the browser is configured with the desired media parameters by providing it with a—possibly modified—SDP data set, which can be done using the SetLocalDescription command, for example.

The media parameters are then sent to the communication partner by a web server. After receiving the response with the media parameters from the communication partner, the web server places the media parameters into the JavaScript code in the browser, which is then configured with the partner's media parameters (using the SetRemoteDescription command, for example), to make communication possible.

The current JSEP specification http://tools.ietf.org/html/draft-ietf-rtcweb-jsep-02#section-1 states that the previously described modification of the SDP data sets takes place in the JavaScript application. A procedure of this type is shown in FIG. 2 as an illustrative example, in which JSEP with JavaScript-based SDP modification is used.

However, the previously described procedure is sometimes not considered to be flexible enough.

BRIEF SUMMARY OF THE INVENTION

According to embodiments of the invention, a first RTC client generates a request for a communication connection to be established. The request therefore contains media-specific data and/or parameters for the first RTC client, and preferably also for the communication connection. Then the request generated by the first RTC client is adapted to the media-specific data and/or parameters of a second RTC client, with which a communication connection is to be established. This adapted request is then transmitted to the second RTC client, and it in turn generates a response to the adapted request. The second RTC client is then configured using the adapted request and response. In addition, the response is also transmitted to the first RTC client, which in turn is configured using the adapted request and the response. The invented method is characterized in that the first RTC client sends the response to a web server—and specifically not "through a web server" to the communication partner—and in the same manner the second RTC client also sends the response to the web server. Also according to the invention, the web server—and not the communication partner's browser—processes the request and sends the adapted request both to the second RTC client and also back to the first RTC client, in addition to sending the response both to the first RTC client and also back to the second RTC client.

BRIEF DESCRIPTION OF THE FIGURES

FIG. 5 and FIG. 6 show two examples of a call setup according to embodiments of the invention.

DETAILED DESCRIPTION OF THE INVENTION

Figure 1:
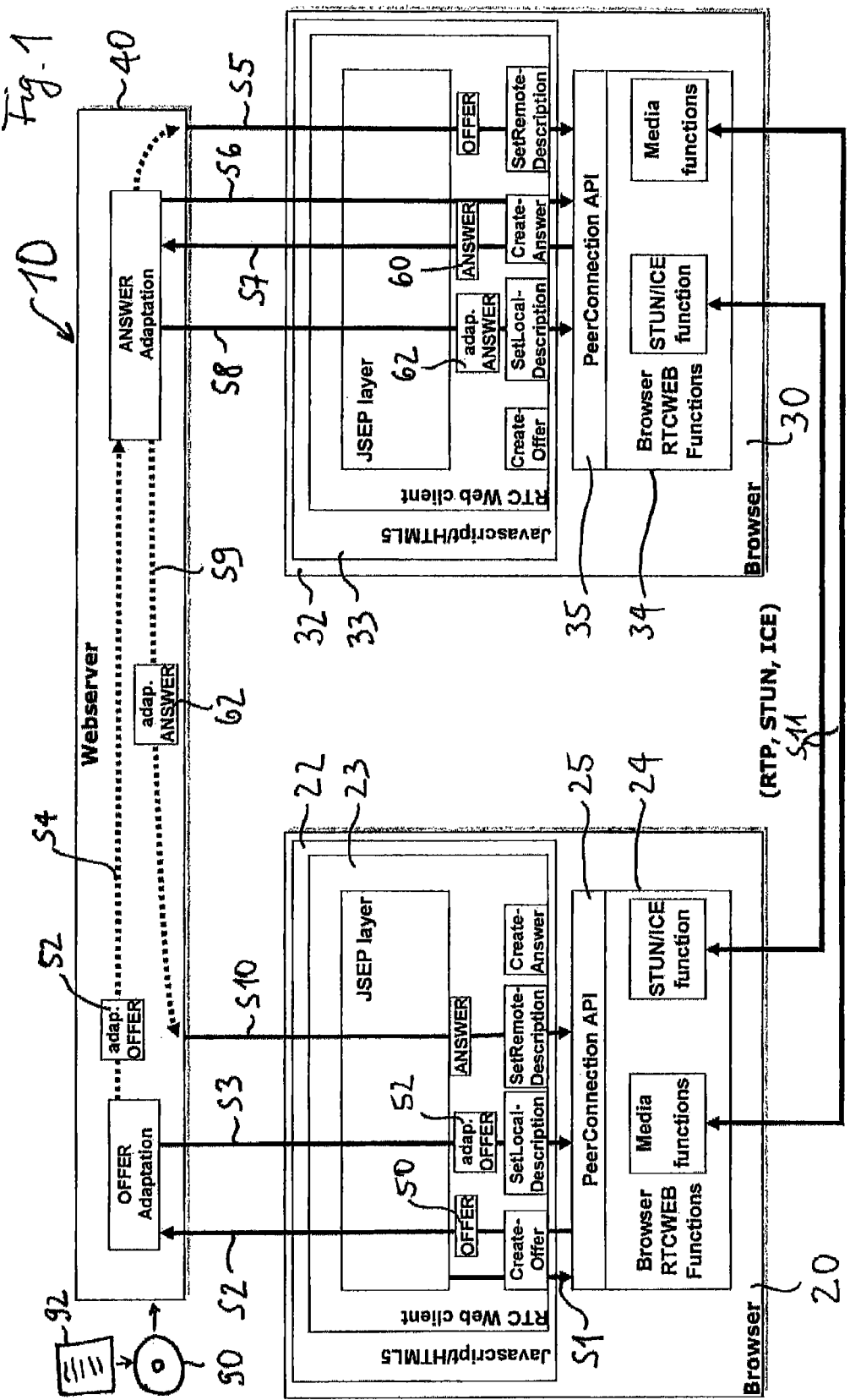
FIG. 1 shows a diagram of one embodiment of a telecommunication system according to the invention, in which individual sequential steps can also be seen.
Figure 2:
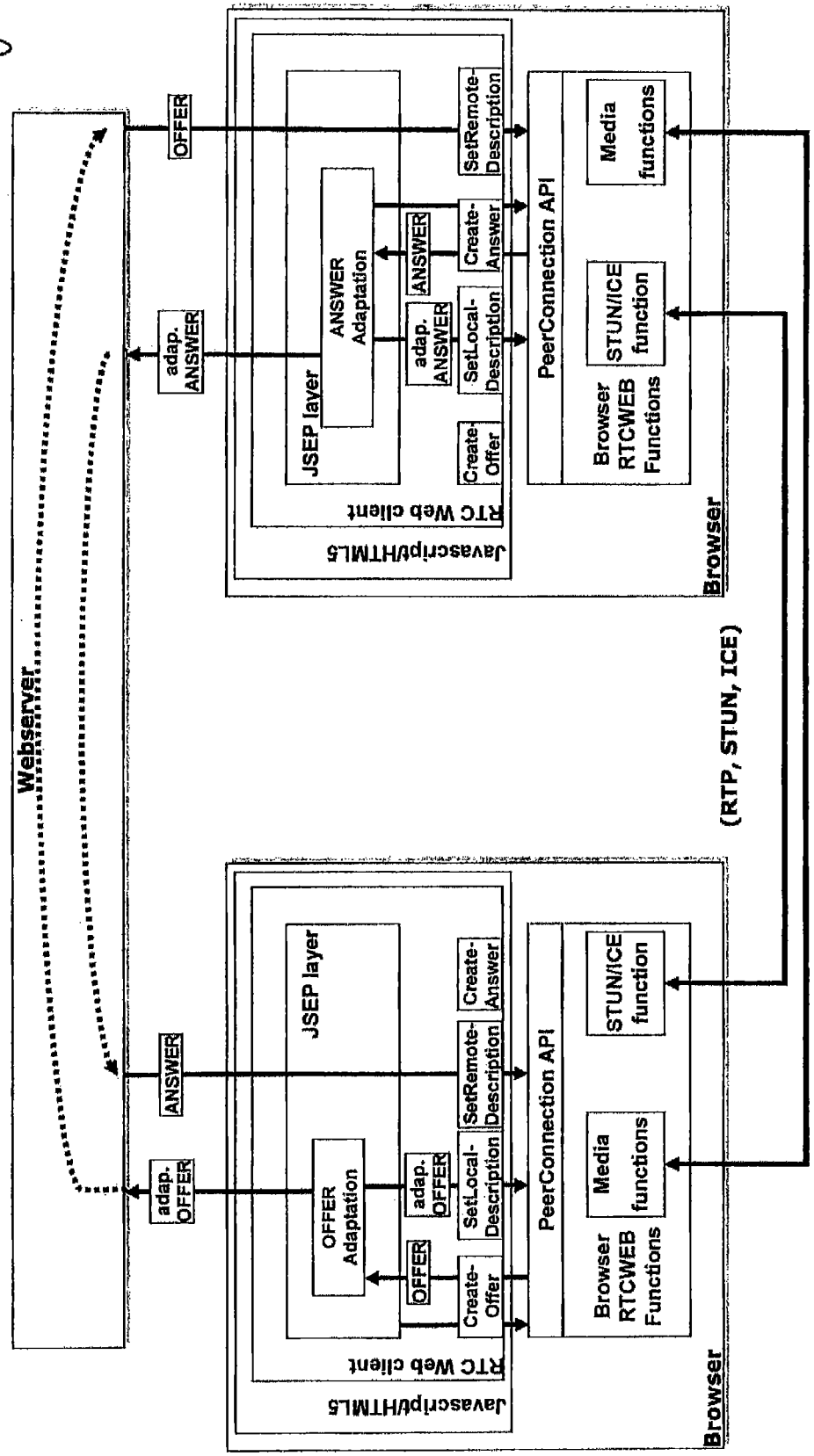
FIG. 2 shows a diagram of a telecommunication system according to the prior art and an overview representation of the sequential steps.

As previously noted, according to embodiments of the invention, a first RTC client generates a request for a communication connection to be established. The request therefore contains media-specific data and/or parameters for the first RTC client, and preferably also for the communication connection. Then the request generated by the first RTC client is adapted to the media-specific data and/or parameters of a second RTC client, with which a communication connection is to be established. This adapted request is then transmitted to the second RTC client, and it in turn generates a response to the adapted request. The second RTC client is then configured using the adapted request and response. In addition, the response is also transmitted to the first RTC client, which in turn is configured using the adapted request and the response. The invented method is characterized in that the first RTC client sends the response to a web server—and specifically not "through a web server" to the communication partner—and in the same manner the second RTC client also sends the response to the web server. Also according to the invention, the web server—and not the communication partner's browser—processes the request and sends the adapted request both to the second RTC client and also back to the first RTC client, in addition to sending the response both to the first RTC client and also back to the second RTC client.

According to embodiments of the invention, there can also be multiple first RTC clients and/or multiple second RTC clients, which are sending and/or receiving different media (audio/video), for example.

This invention is therefore based on the concept of having the request (SDP modification in one example) changed not through the JavaScript code in a browser but rather in the web server. To do this, the appropriate data must be addressed to the corresponding web server, which is not used exclusively as the transit station for data and/or parameters, requests and responses.

In this case, it should be noted that the protocols between a browser and a web server do not necessarily have to be defined. However, the data and the codecs, etc. do have to be defined, which still does not require the use of the SDP. However, usually a browser sends an SDP to a WebRTC client, through a CREATE command, for example. For a better understanding of this invention, some abbreviations and explanations are summarized below:

- (S)RTP=(Secure) Real-Time Transport Protocol, see RFC 3550, RFC 3711,
- STUN=Session Traversal Utilities for NAT (Network Address Translation), see RFC 5389,
- ICE=Interactive Connectivity Establishment, see RFC 5245,
- REST=Representational State Transfer,
- SIP=Session Initiation Protocol
- a WebRTC client is typically a web browser,
- a request is generated, for example, through an SDP-OFFER,
- a response is generated, for example, through an SDP-ANSWER, According to one advantageous version of the invented method, the web server adapts the response to the media-specific data and/or parameters of the first RTC client—as well as the communication connection if necessary—before the web server transmits the (adapted) response to the first RTC client and to the second RTC client. This is particularly advantageous when the situation has changed between transmission and response, which can occur, for example, when the band width changes due to an additional video connection.

The invented method is particularly advantageous when multiple communication devices are assigned to one user, each having a first RTC client and/or a second RTC client, and when different media types are sent to different communication devices. This means that, for example, audio data can be sent to a smart phone with hands-free capability, but video data is sent to a tablet or notebook to be played on its larger screen. In such cases, the web server can modify the media parameters appropriately, based on knowledge of the various devices and the user's preferences. Therefore, this invention offers particular advantages when media streams include different types of media.

It can be advantageous when the connection between the first RTC client, the second RTC client, and the web server is a so-called Web-Socket connection or an HTTP-PUT request.

It can offer further advantages when so-called RESTful procedures are used in combination with asynchronous event reporting for the communication between the first RTC client, the second RTC client, and the web server. Here, for example, a call with multiple participants is modeled as a set of resources assigned to each of the participating users and managed centrally on the web server, wherein the web server then also coordinates these resources into a single overall picture of the call.

According to one embodiment of the invention, the Session Description Protocol (SDP) can be used to generate and transmit the request, the adapted request, the response, and, if applicable, the adapted response.

A computer program product configured to be suitable for executing the previously described method, as well as a machine-readable data carrier on which the computer program product is stored, are also considered part of this invention.

The problem on which the invention is based is further solved with a telecommunication system consisting of a web server, a first RTC client that is either connectable or already connected to the web server, and a second RTC client that is either connectable or already connected to the web server. The invented telecommunication system is therefore configured such that the web server, the first RTC client, and the second RTC client have equipment suitable for executing the previously described method. This equipment can consist, for example, of software components, processors suitable for running these software components, and/or hardware components or similar items.

Additional advantages, features, and characteristics of the present invention are presented in the following description of advantageous embodiments with reference to the drawing.

According to FIG. 1, the invented telecommunication system 10 comprises a web server 40, a first RTC client 20, and a second RTC client 30, each of which is or at least can be connected to the web server 40. Both RTC clients are or preferably include browsers or WebRTC browsers. Each of the RTC clients 20, 30 is equipped with a first functional unit 22 or 32 and a second functional unit 24 or 34. The first functional unit 22, 32 includes JavaScript/HTML5, a JSEP layer, and an RTCWeb client 23 or 33, and the second functional unit 24 or 34 includes the functions of a WebRTC browser (the RTCWeb reference in FIG. 1 is equivalent to the WebRTC designation) and contains a PeerConnection API 25 or 35.

FIG. 1 also shows schematically an illustrated data carrier 90, in the form of a CD, on which a computer program product 92 is stored and which can be read by the web server 40, for example.

Below, with reference to FIG. 1, an embodiment of the invented method for establishing a communication connection suitable for transmitting media streams from a first browser or RTC client 20 to a second browser or RTC client 30 is described. In other words, FIG. 1 refers to an invented method in which JSEP with web server-based SDP modification is used.

In a step S1, the WebRTC client 23 calls a PeerConnection API (API=Application Programming Interface) 25 of the second functional unit 24 in the browser 20 using the CreateOffer method.

In a step S2, as a result, an SDP data set is generated by the browser 20, marked as a request 50 in the form of an SDP OFFER, and provided to the WebRTC client 23. This request 50 contains media-specific data and parameters for the first browser 20 and the communication connection. The WebRTC client 23 forwards this request 50 to the web server 40, for example through an already existing web-socket connection, an HTTP-PUT request, or other methods.

Next, in a step S3, the web server 40 can adapt or manipulate the SDP OFFER 50 in a variety of ways in a special "OFFER adaptation" function. Examples of this would be reducing the number of offered codecs or eliminating video streams, if there was not enough band width available, for example. This adapted response or SDP OFFER 52 is next sent back to the WebRTC client 23 in the browser 20 and forwarded through a SetLocalDescription method of the PeerConnection API 25 to the first browser 20, which it then configures.

In a step S4, which can take place simultaneously with step S3, the adapted request 52 is sent to the second browser 30 in the form of an adapted SDP OFFER and is shared for the subsequent generation of an adapted response 62 in the form of a modified SDP ANSWER by the second browser 30 with a so-called "ANSWER adaptation" function.

In a step S5, the adapted request 52 is then forwarded to the second browser 30, e.g., through an already existing web socket connection.

In a step S6, the adapted request 52 in the second browser 30 is forwarded by means of the SetRemoteDescription method of the PeerConnection API 35 to the browser 30. To generate a response 60 in the form of an SDP ANSWER, the WebRTC client 33 calls up the Create-Answer method of the PeerConnection API 35 and receives an SDP data set marked as SDP ANSWER.

In a step S7, the WebRTC client 33 forwards the response 60 back to the web server 40, e.g., through an already existing web-socket connection, an HTTP-PUT request, or other methods.

Next, in a step S8, the SDP ANSWER 60 can be manipulated or adapted again in an "ANSWER adaptation" function with reference to the correspondingly adapted SDP OFFER 52, and an adapted response 62 can be generated in the form of an adapted SDP ANSWER. This adapted SDP ANSWER 62 is then sent back to the WebRTC client 33 in the second browser 30 and forwarded through the SetLocalDescription method of the PeerConnection API 35 to the browser 30, which it then configures. The described step S8 is optional, since the response 60 or SDP ANSWER does not need to be adapted unless necessary. However, the step S8 as such is necessary in order to call up the SetLocalDescription method.

In a step S9, which can occur simultaneously with step S8, the adapted SDP ANSWER 62 is sent back to the WebRTC client 23 in the first browser 20.

In a step S10, the adapted SDP ANSWER 62 is forwarded by means of the SetRemoteDescription method of the PeerConnection API 25 to the browser 20, which it then configures.

Both browsers 20, 30 now know the media parameters of their respective counterparts and can exchange media streams, which is represented in a step S11. The abbreviations RTP, STUN, and ICE shown here stand for the exchange of the protocols used, as applicable.

Figure 3:
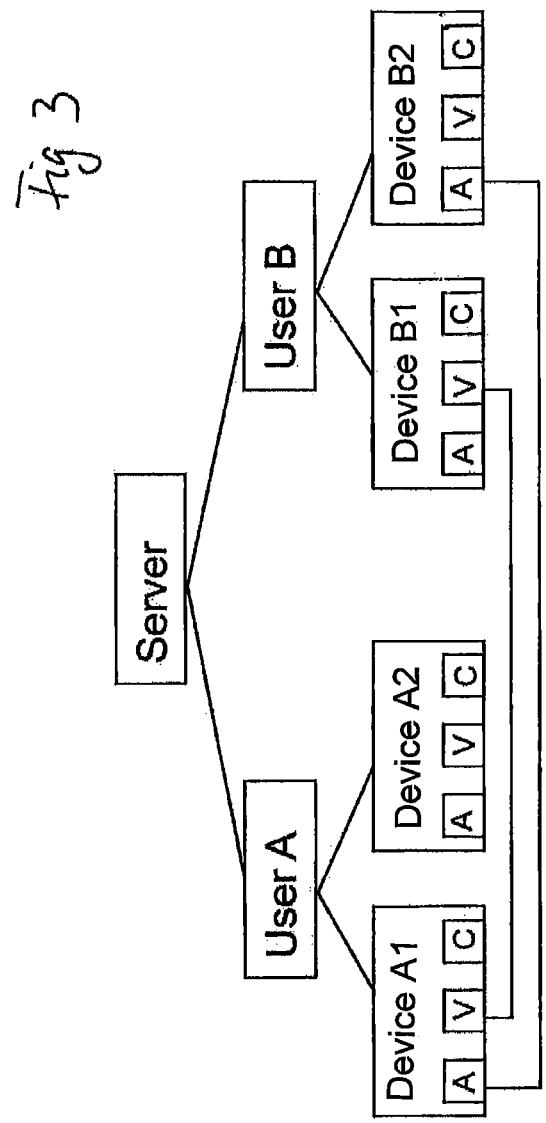
FIG. 3 shows a schematic diagram of a configuration in which audio and video data are transmitted from one participant to another participant.

FIG. 3 illustrates, as an example, a call in which a participant B receives audio data from a device B2 and video data from another device B1, and the server combines the SDP data from these two end devices B1 and B2 into one SDP description before it is sent to participant A. According to this example, participant A can then receive both the audio data A and the video data V on the same device A1, i.e., from device B2 or from device B1 of participant B. As can be seen from this example, the device A2 of participant A is not used at all. In this particular example, the data C represents data in general, such as that used for control signals, for example, or Instant Messaging, for example. The data C can therefore be any data except the aforementioned audio and video data. Obviously, many other examples of a connection with various media are possible.

Figure 4:
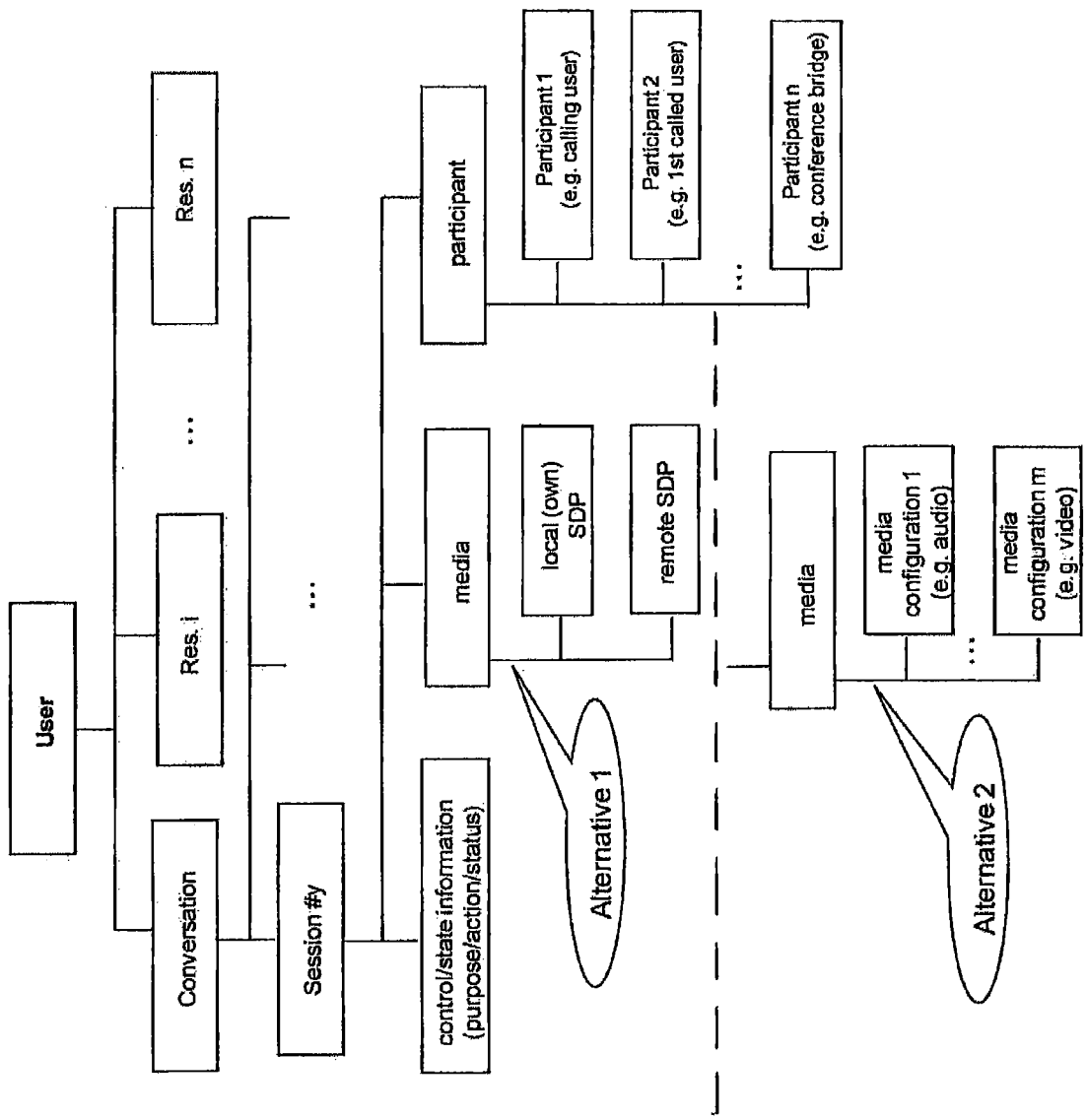
FIG. 4 shows a diagram of a conference resource model.

FIG. 4 illustrates an exemplary model of a session resource used by a RESTful server. This exemplary embodiment is based on the concept of resources used in the Web and uses a method for communication between web servers and clients that involves the use of RESTful (Representational State Transfer) procedures with asynchronous event reporting instead of one of the known signaling protocols such as SIP (Session Initiation Protocol). REST describes a particular programming style for web applications. A description of its basic principles is available at http://de.wikipedia.org/wiki/Representational_State_Transfer, for example. REST is based on the abstract model of a resource on a web server, which can be unambiguously accessed using a URI (Uniform Resource Identifier). There is a set of standard commands for this purpose, designated as CRUD (Create, Read, Modify/Update, Delete), with which the resource can be generated, read, changed, and even removed. These commands are executed, for example, using the HTTP methods PUT, GET, POST, and DELETE. These RESTful CRUD operations are illustrated here, for example, with the following HTTP methods:

Create→HTTP POST
Read→HTTP GET
Update→HTTP PUT
Delete→HTTP DELETE

In this way the caller can place a new resource on the server, if he calls another participant and initiates a new communication session. This can be handled completely using the REST principles.

Beyond this point, the RESTful CRUD operations alone are not sufficient. Here, a new NOTIFY operation, previously unavailable in REST, is necessary, allowing the call recipient to also find out that he has been invited to the communication session or is being called right now. By means of the NOTIFY operation, the call recipient is informed that a new resource (i.e., a new communication session) was initiated.

Then the call recipient can also use the REST principles.

The NOTIFY operation is also necessary at the caller's end if the resource changes, because of the call recipient announcing his media parameters, for example. Additional details about this can be found at http://de.wikipedia.org/wiki/CRUD.

FIG. 4 illustrates how a call or an active communication relationship can be modeled as a session resource. It shows the user or participant as the primary resource and multiple sub-resources for one or more calls, media used (audio, video), other participants (e.g., in a conference call), etc. According to this example, a call with two to n participants is modeled as a set of resources assigned to each of the participating users and managed centrally on the web server. The web server coordinates these resources into a single overall picture of the call.

The sequences diagrammed above in FIG. 1 use the two containers positioned under "media" in FIG. 4 to exchange the adapted request (SDP OFFER) 52 and the (adapted) response (SDP ANSWER) 60 or 62 between the clients 20, 30 and the web server 40 in the order shown in FIG. 1. This is managed first by the standard commands Create, Read, Modify, Delete, included in the RESTful set, oriented on HTTP (Hypertext Transfer Protocol), and issued by the client to the server (synchronous request/response method), and second through asynchronous event reports from the server to the client (the aforementioned NOTIFY operation).

As previously illustrated, modified function distribution during SDP generation is possible according to the invention. It is also possible to implement resource-based control instead of using the customary signaling protocol.

In summary:

The resources are located on a so-called back-end server,

Each participant or user represents a root on the respective resource tree,

One session resource #y is one instance of a participant's conversation resource (i.e., the respective conversation), The sub-resource media describes the current media configuration per media type (alternative 2) or per end point (alternative 1), The participant sub-resources are all participating users in a session, A conference bridge is also modeled as a separate participant, e.g., with a media server that handles all media streams.

Figure 5:
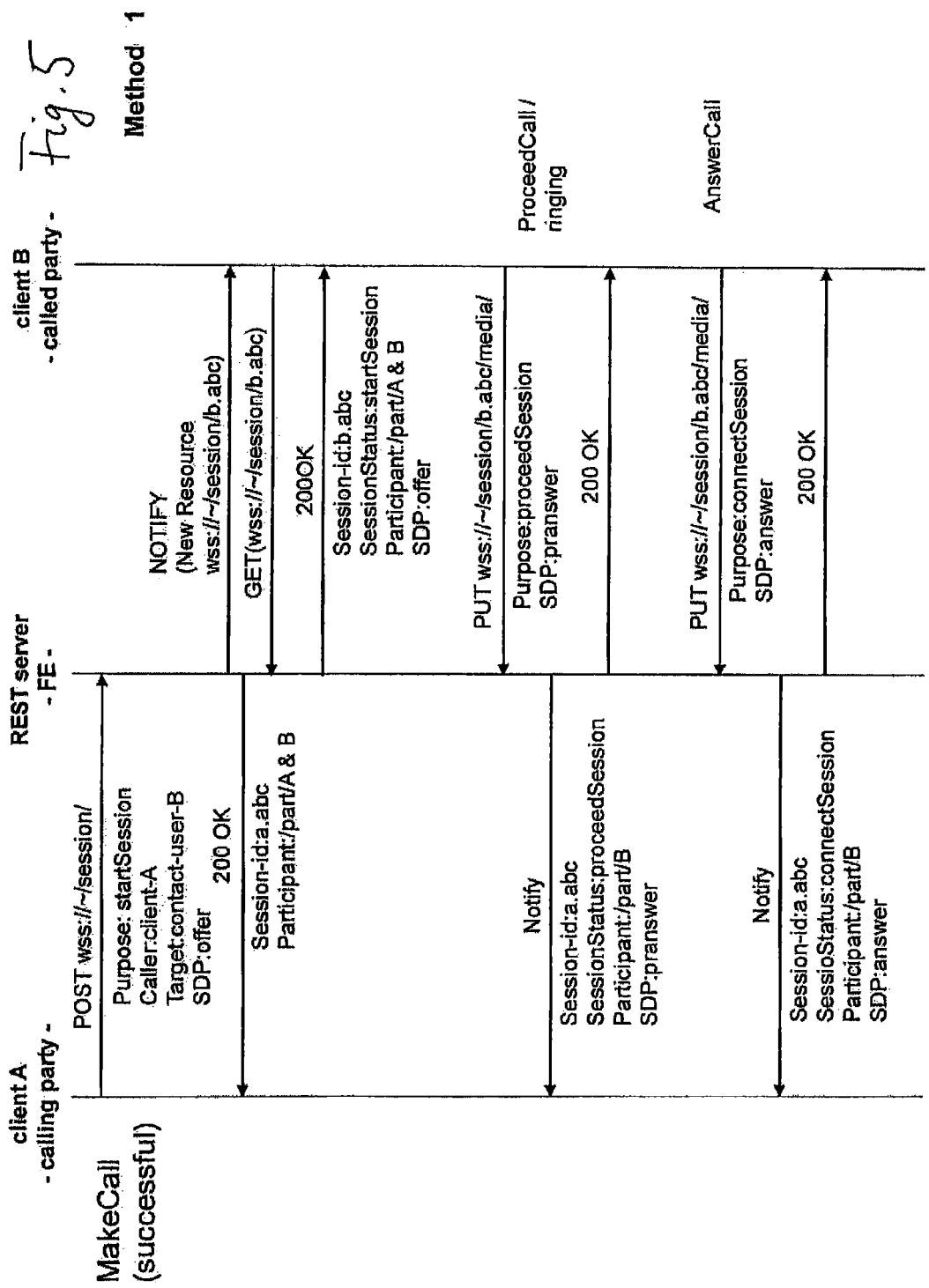

FIG. 5 illustrates a first method for initiating a call from a caller (Calling Party) through a REST server ((Functional Entity or FE) to a call recipient (Called Party). A GET request is sent to the resource, which was announced by NOTIFY. The related message 200 OK therefore contains all parameter values for the related instance of the resource and all sub-resources with their parameter values.

According to the method 2 illustrated in FIG. 6, the NOTIFY message could even already contain the parameter values. This can eliminate the need for the GET request from the first alternative.

Obviously the NOTIFY command can include one or more resource URIs (with additional parameters if necessary). In the case of a resource URI without additional parameters, the client must then send one or more GET requests for each resource URI, in order to obtain all the information.

If the GET request contains a resource URI with additional parameters, then only changed parameters for each resource are received.

This applies similarly to the PUT request. If the PUT request contains only one resource URI without additional parameters, then a completely new resource is set up. For a resource URI with additional parameters, only the sub-resources are changed corresponding to the parameters.

By way of further explanation, the expression "SDP pranswer" in connection with a NOTIFY message refers to the concept of a "provisional answer" in JSEP, which is equivalent to a type of preview.

It should be noted that the features previously described as method steps (components of the invented method) can also similarly be considered as equipment features of the invented telecommunication system with no specific mention required. This correspondence of features also applies inversely for the elements of the telecommunication system described as equipment features.

It should further be noted that the features of the invention described by referencing the presented embodiments, for example web server, (Web)RTC clients, the type and configuration of the parameters used, control commands, protocols and hardware components, the arrangement of the individual components in relation to each other or the sequence of the respective process steps can also be present in other embodiments or variations hereof, unless stated otherwise or prohibited for technical reasons. Not all features of individual embodiments described in combination must necessarily always be implemented in any one particular embodiment.

LIST OF REFERENCE INDICATORS

10=Telecommunication system
20=First browser/RTC client
22=First functional unit
23=First WebRTC client
24=Second functional unit
25=PeerConnection API
30=Second browser/RTC client
32=First functional unit
33=Second WebRTC client
34=Second functional unit
35=PeerConnection API
40=Web server
50=Request/SDP OFFER
52=Adapted request/SDP OFFER
60=Response/ANSWER
62=Adapted response/ANSWER
90=Data carrier
92=Computer program product
S1-S11=Steps
A=Audio data
C=General data
V=Video data

We claim:

1. A method for establishing a communication connection suitable for transmitting media streams from a first Real-Time Communication (RTC) client to a second RTC client, comprising the following steps:

receiving a first request from a first RTC client to establish a communication connection with a second RTC client, wherein the first request contains at least one of media-specific data and media parameters for the first RTC client and parameters for the communication connection;

converting the first request based on media-specific data and/or media parameters of the second RTC client and based on the parameters for the communication connection to generate an adapted first request;

sending the adapted first request to the second RTC client for the second RTC client to generate a first response to the adapted first request;

sending the adapted first request to the first RTC client;

receiving the first response to the adapted first request from the second RTC client and converting the received first response to form an adapted first response;

sending the adapted first response to the first RTC client and also sending the adapted first response to the second RTC client for configuring the second RTC client using the adapted first request and the adapted first response and configuring the first RTC client using the adapted first request and the adapted first response.

2. The method of claim 1, wherein the first request received from the first RTC client further comprises data for the communication connection and wherein the at least one of the media-specific data and the media parameters for the first RTC client relates to output of audio data and/or video data at the first RTC client.

3. The method of claim 1, wherein the at least one of the media-specific data and the media parameters for the first RTC client relates to output of audio data and/or video data at the first RTC client, the method further comprises:

converting the first response based on the media-specific data and/or the media parameters of the first RTC client to generate the adapted first response before sending the adapted first response to the first RTC client and to the second RTC client.

4. The method of claim 3, further comprising:
converting the first response based on the parameters for the communication connection included in the first request received from the first RTC client;
establishing the communication connection for transmitting the media streams from the first RTC client to the second RTC client after the first RTC client is configured using the adapted first request and the adapted first response and the second RTC client is configured using the adapted first request and the adapted first response.

5. The method of claim 1, wherein multiple communication devices are assigned to one user, each of the multiple communication devices having at least one of a first RTC client and a second RTC client, and wherein different media streams are sent to different communication devices.

6. The method of claim 5, wherein the media streams contain different types of media.

7. The method of claim 1, wherein a Web-Socket connection or a Hypertext Transfer Protocol (HTTP-PUT) request is a connection between the first RTC client, the second RTC client, and a web server.

8. The method of claim 1, wherein a communication connection between the first RTC client, the second RTC client, and a web server involves use of Representational State Transfer procedures in combination with asynchronous event reporting.

9. The method of claim 1, wherein the first request, the adapted first request, the first response, and the adapted first response are generated through a Session Description Protocol.

10. A non-transitory computer readable medium having a computer program stored thereon, the computer program containing executable code that, when executed, carries out the method of claim 1.

11. A telecommunication system comprising:
a web server;
a first Real-Time Communication (RTC) client connected or connectable to the web server; and
a second RTC client connected or connectable to the web server, wherein the web server is configured to:
receive a first request from a first RTC client to establish a communication connection with a second RTC client, wherein the first request contains at least one of media-specific data and media parameters for the first RTC client and parameters for the communication connection;
convert the first request based on media-specific data and/or media parameters of the second RTC client and based on the parameters for the communication connection to generate an adapted first request;
send the adapted first request to the second RTC client for the second RTC client to generate a first response to the adapted first request;
send the adapted first request to the first RTC client,
receive the first response to the adapted first request from the second RTC client and convert the received first response to generate an adapted first response; and
send the adapted first response to the first RTC client and also sending the adapted first response to the second RTC client for configuring the second RTC client using the adapted first request and the adapted first response and configuring the first RTC client using the adapted first request and the adapted first response.

12. The system of claim 11, wherein:
the first RTC client is configured using the adapted first request and the adapted first response; and
the second RTC client is configured using the adapted first request and the adapted first response.

13. The system of claim 12, wherein the first RTC client include a first browser and the second RTC client includes a second browser.

14. The system of claim 13, wherein the adapted request includes a Session Description Protocol (SDP) OFFER and the adapted response includes a SDP ANSWER.

15. The system of claim 14, wherein a connection between the first RTC client, the second RTC client, and the web server involves a Web-Socket connection or a Hypertext Transfer Protocol (HTTP-PUT) request.

16. The system of claim 14, wherein a communication connection between the first RTC client, the second RTC client, and the web server involves use of Representational State Transfer procedures in combination with asynchronous event reporting.

17. The system of claim 14, wherein the media streams contain different types of media.

18. The system of claim 17, wherein the media streams include at least one audio stream and at least one video stream.

19. The system of claim 14, wherein the first RTC client is a Real-Time Communication via the Worldwide Web (WebRTC) client and the second RTC client is a WebRTC client.

* * * * *